April 9, 1963 D. W. FOSS 3,085,199

TUNABLE MICROWAVE CAVITY RESONATOR WITH CALIBRATED DIAL

Filed Jan. 16, 1961 2 Sheets-Sheet 1

INVENTOR.
DAVID W. FOSS

BY Edgar O. Rost

ATTORNEY

TUNABLE MICROWAVE CAVITY RESONATOR WITH CALIBRATED DIAL

Filed Jan. 16, 1961

INVENTOR.
DAVID W. FOSS
BY Edgar O. Rost
ATTORNEY

United States Patent Office 3,085,199
Patented Apr. 9, 1963

3,085,199
TUNABLE MICROWAVE CAVITY RESONATOR WITH CALIBRATED DIAL

David W. Foss, Beverly, Mass., assignor, by mesne assignments, to Varian Associates, Palo Alto, Calif., a corporation of California Filed Jan. 16, 1961, Ser. No. 82,917
13 Claims. (Cl. 324—81)

The present invention relates to a microwave cavity resonator and, in particular, to a novel method and means for indicating the frequency of operation in relation to the position of the tuning plunger within the resonant cavity.

Prior art frequency indicating means employed in cavity resonator structure comprise micrometer type graduated mechanisms requiring conversion to the frequency by means of a calibration chart. Another prior art embodiment employs a direct-reading cylindrical configuration mechanism cooperating with the tuning plunger. Since the relationship between resonant frequency and plunger position is non-linear, the spacings between markings at the high end of the frequency band are crowded together. To differentiate small increments in frequency adjustment in such structures becomes difficult for the user.

The present invention avoids the shortcomings and difficulties in prior art frequency reading mechanisms. The principal object of this disclosure is to provide a novel method and means for direct frequency reading of a non-linear device in a near linear manner. A further object is to provide an improved frequency reading mechanism which avoids close calibration separations at the higher frequencies. A still further object is to provide an improved frequency reading mechanism for a cavity resonator device which may be reproduced in production quantities without costly adjustment of each mechanism to conform to individual discrepancies of a non-linear tuning structure.

The aforementioned objects, as well as features and advantages will be revealed in the following detailed specification and appended drawings, wherein.

Figures 1, 2:
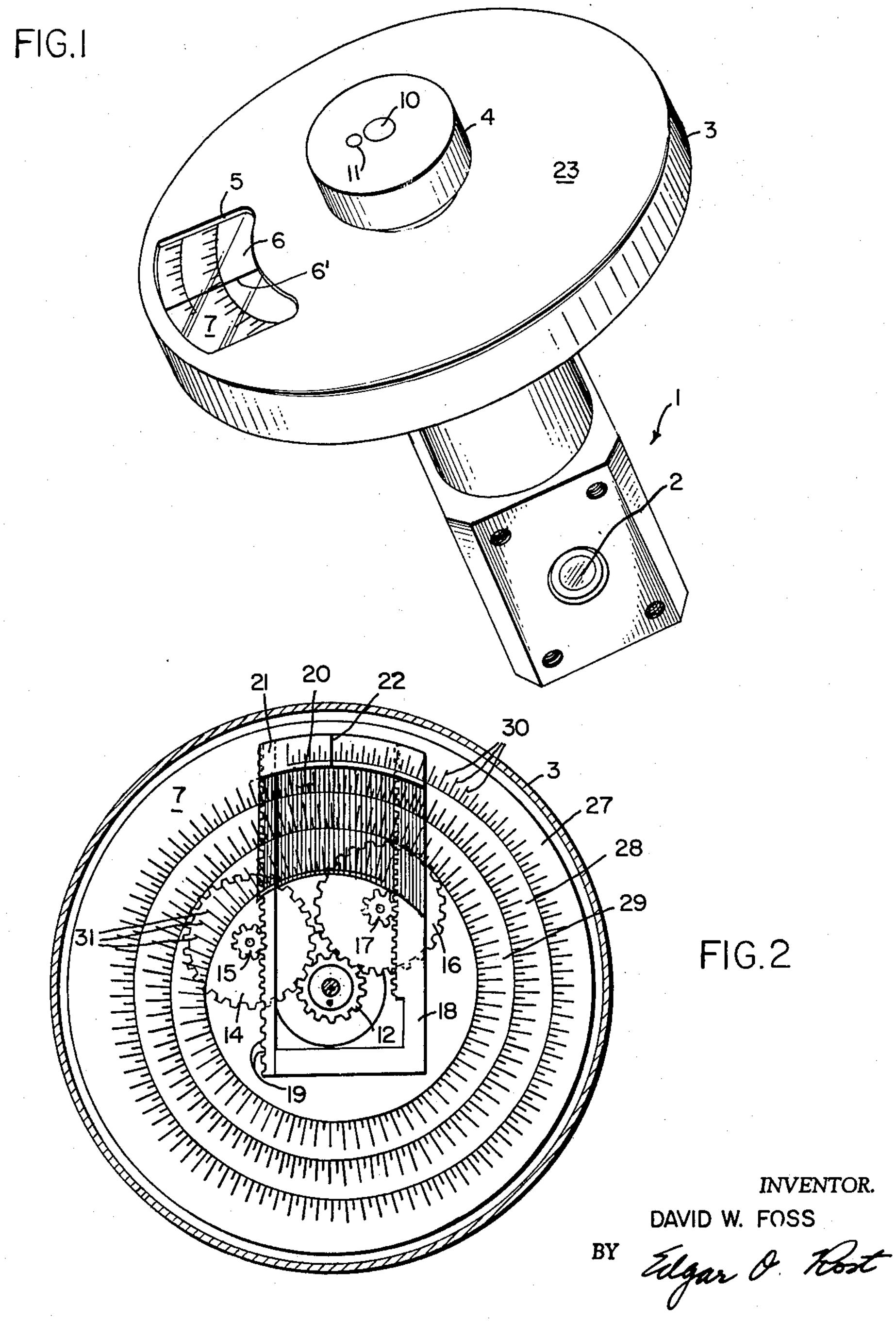
FIG. 1 is a perspective view of the illustrative embodiment.
FIG. 2 is a plan view of the tuning mechanism.

Referring next to the drawings, FIG. 1 illustrates a preferred embodiment of the invention comprising a cavity resonator 1 having recessed coupling apertures and windows 2. The frequency reading mechanism is contained within the cylindrical housing member 3 and the overall tuning adjustment for the conventional plunger arrangement is activated by a control knob 4. In the present application a dial 7 bearing the frequency information is exposed to the user through an opening 5 enclosed by a transparent window 6 having a cross hair reference line 6'.

Figures 3, 4:
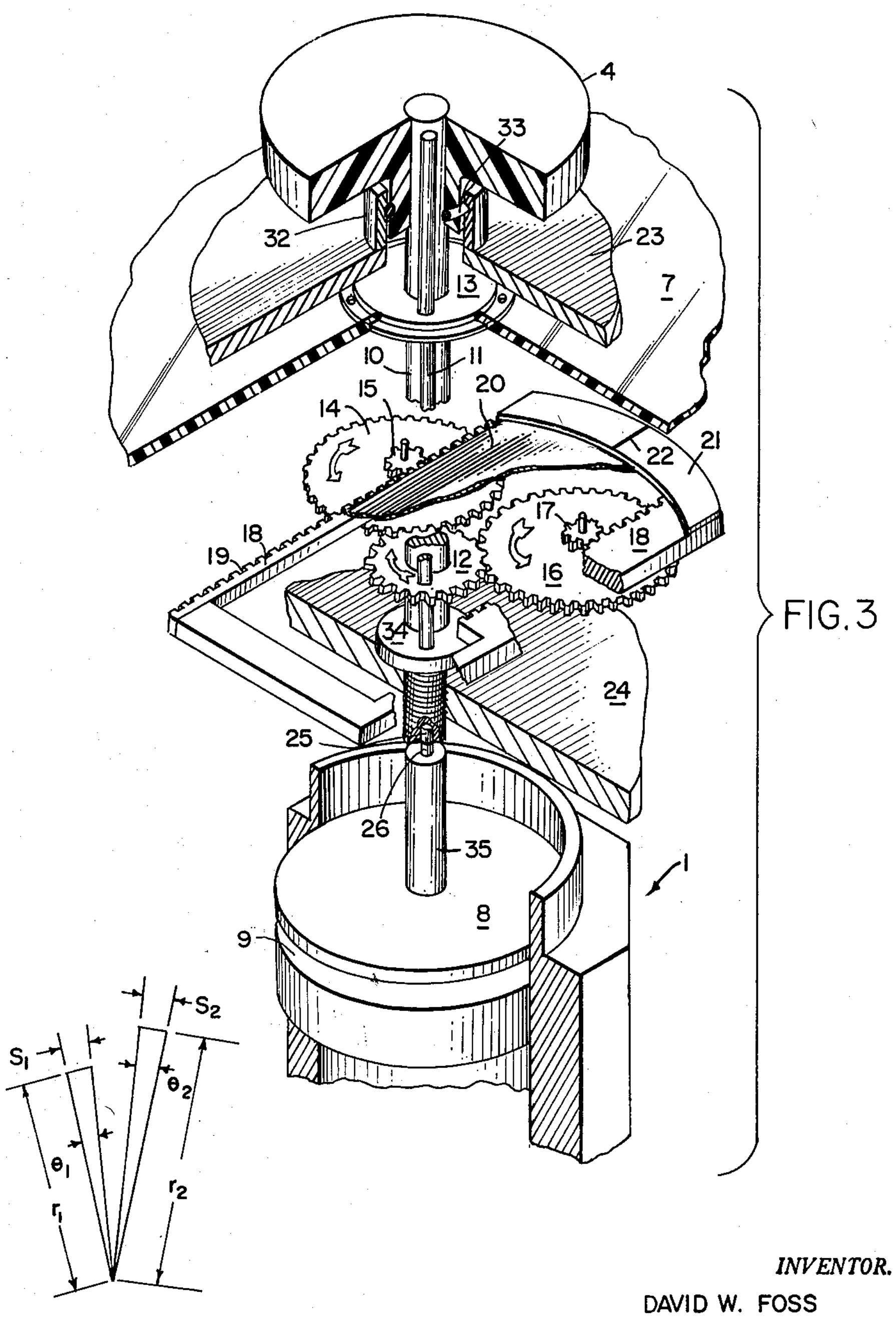
FIG. 3 is an exploded view of the embodiment of the invention.
FIG. 4 is a diagram explaining the mathematical considerations of the invention.

Referring now to FIG. 3 the complete mechanism will be described. Tuning plunger 8 extends axially within the inner cylindrical walls of cavity resonator 1 and defines a choke section 9 in the manner well-known in the art. The tuner screw 10 controls the downward movement of the plunger and hardened metal inserts 25 and 26 are provided at the mating surfaces of the screw 10 and plunger rod 35. A spring and bellows arrangement (not shown) will provide for upward movement when the direction of the screw 10 is reversed in the conventional manner and need not be specifically described in this disclosure.

Drive pin 11, secured at one end to collar 34 and at the other end to knob 4, extends coaxially with the tuner screw 10. Rotation of knob 4 will result in rotational movement of the main drive gear 12, as well as the metallic central hub 13 secured to the transparent dial 7. The auxiliary gear system comprising large gears 14 and 16 together with smaller superimposed pinion gears 15 and 17 will be disposed on either side of main drive gear 12, to result in horizontal movement of the rack 18 by way of bearing teeth 19 disposed on similar sides. The upper surface of rack 18 supports a plate 20 which is shown partially broken away in the illustrated view. Plate 20 is preferably completely black with the exception of an arcuate front section 21 which is white and has a central black hair line 22. Lines 6' and 22 provide for ease in viewing the frequency markings and eliminate parallax errors.

An O ring 33 within collar 32 provides a bearing surface and dust seal for the hub of knob 4. Spacers (not shown) separate the various elements properly and are of low-friction material. An upper cover plate 23, as well as lower cover plate 24 together with a cylindrical side wall form the housing member 3 to enclose the mechanism completely.

In the overall determination of appropriate gearing ratio a predetermined frequency range of 500 megacycles was selected. A ½-13 NC screw thread was selected for tuner screw 10 and the main drive gear 12 has twenty-four teeth while the large gears 14 and 16 were selected with forty teeth. The pinion gears 15 and 17 have eight teeth and the rack forty-eight so that for each resolution of the main drive gear 12 the rack will move horizontally $\pi/10$ inch or .3146 inch.

The frequency indicating means inscribed on dial 7 and the mathematical considerations involved in the invention will now be described, reference being directed to FIG. 2 and FIG. 4.

The dial 7 has inscribed thereon a continuous array of frequency markings disposed in a helical path with the outer row designated by the numeral 27 and the inner row 29 with an intermediate row 28 therebetween. The number of turns will be dependent upon space limitations and range of bandwidth desired. In a working embodiment a six inch dial with the number of helical arrays illustrated resulted in a 500 megacycle tuning range. The overall length of the resonant cavity (L), as well as diameter (D) for a desired frequency and mode of propagation may be calculated for the upper and lower frequency limits (D, $L_2$ and $L_1$ respectively) from the following equation:

$$L^2=\frac{BN^2}{f^2-A/D^2} \qquad (1)$$

wherein A is the constant for the mode propagated, B is the velocity of electromagnetic energy propagated in a dielectric and N is the number of half wavelengths along the cylinder axis.

If Equation 1 for $L^2$ is rearranged and differentiated the tuning rate will be computed as follows:

$$\frac{df}{dL}=-\frac{BN^2}{fL^3} \qquad (2)$$

Since the frequency has been selected and $L_1$ and $L_2$ can be determined from Equation 1, the $$\frac{df_1}{dL} \text{ and } \frac{df_2}{dL}$$

(tuning rates at the lowest and highest frequencies respectively) are readily computed.

For the greatest accuracy, frequency separations 30 and 31 of one megacycle were selected with each traversed by the revolution of the tuner screw through an angle $\theta°$. Since 360° or/revolution of the tuner produces $$\frac{1}{p}\frac{df}{dL}\text{ mc.}$$

of frequency change, we now have:

$$\frac{\theta \times \frac{df}{dL}}{360 \times p}=1 \text{ or } \theta=\frac{360/p}{df/dL} \qquad (3)$$

where $p$ is the value for the pitch of the tuner screw 10.

Having determined that approximately three revolutions of the dial shall cover the tuning range and selected a gear system 12, 14–17 to advance frame 18 vertically $\pi/10$ inches for each revolution, the radii of the calibration path go from $r_1$ to $r_2$. Then, $r_2-r_1$ equals $$\frac{n\pi}{10}$$

where $n$ is the number of revolutions of the tuner screw 10 required to cover the entire frequency range.

In addition:

$$L_1-L_2=\frac{n}{p}\text{; and } r_2-r_1 \qquad (4)$$

becomes:

$$r_2-r_1=\frac{\pi p}{10}(L_1-L_2) \qquad (5)$$

Since linearity of calibrations is desired the arc S, traversed in going from $f_1$ to $f_1+1$ should equal the arc $S_2$ in going from $f_2-1$ to $f_2$.

Then:

$$S_1=r_1 \tan \theta_1=S_2=r_2 \tan \theta_2=(r_1+r_2-r_1) \tan \theta_2. \qquad (6)$$

Substitution from Equation 5 results in:

$$r_1 \tan \theta_1=\left[r_1+\frac{\pi p}{10}(L_1-L_2)\right] \tan \theta_2 \qquad (7)$$

And the general formula becomes:

$$r_1=\frac{\frac{\pi p}{10}(L_1-L_2) \tan \theta_2}{\tan \theta_1-\tan \theta_2} \qquad (8)$$

Since all the values may be determined, $r_1$ is readily ascertained and represents the radius of the first calibration mark ($f_1$) required for equally-spaced calibrations. Calculations for determining calibration spacings for all mid frequencies have shown that the deviation from linearity does not exceed 3% to indicate that the desired linear calibration markings for a non-linear tuned device may be achieved. Empirical verification of calculated values has indicated that once a master dial has been prepared, any number of reproductions may be fabricated with very minor variations.

The invention described herein will thus provide a readily usable frequency indicating means for tunable cavity resonators. Since the calibration markings will be linear the user will not be confronted with closely crowded lines at the high end of the frequency band. While a specific illustrative embodiment of the tuning mechanism has been described, it will be evident to skilled artisans that the mechanism and method disclosed may be applied to many non-linearly tuned microwave devices.

What is claimed is:

1. A microwave cavity resonator tunable over a predetermined frequency band and defining a hollow cylindrical cavity with a movable tuning plunger disposed therein along the cylinder axis, actuating means disposed perpendicularly to the cylinder axis and cooperating with said plunger to axially move same, said actuating means comprising a gear system activating a movable frame member controlled by a rotatable member to thereby advance said frame member horizontally a predetermined dimension for each increment of rotation, rotatable frequency indicating means secured to said rotatable member and disposed above said frame member, said indicating means comprising a dial member having inscribed thereon a plurality of substantially equally spaced markings forming a helical array, said frame member moving progressively in a horizontal direction as said dial member rotates to thereby indicate the frequency at which the resonator is resonant.

2. A microwave tunable cavity resonator as claimed in claim 1 wherein said dial member is of a transparent material.

3. A microwave tunable cavity resonator as claimed in claim 1 wherein said frame member supports on its upper surface a plate member having an arcuate front portion aligned with the curvature of the helical array.

4. A microwave tunable cavity resonator as claimed in claim 3 wherein said plate member is coated with a light colored material commencing at said front portion and extending over an area similar in width to that of the helical array with the remainder of said plate member being coated with a dark colored material.

5. A microwave tunable cavity as claimed in claim 1 wherein the innermost marking commencing the helical array represents the lower limit of the frequency band of operation.

6. A mechanical linkage system for tuning a microwave cavity resonator of the type having a movable tuning plunger disposed along the axis of a hollow cylindrical chamber, said mechanical linkage system comprising a rotatable member cooperating with a gear system and movable frame member positioned normal to the chamber axis to advance said frame member horizontally a predetermined dimension for each increment of rotation, said rotatable member also contacting said plunger to control the axial movement thereof, a circular planar dial member secured to said rotatable member in a position above said frame member, said dial member bearing a plurality of substantially equally spaced frequency indices forming a helical array, said frame member underlying predetermined frequency indices as the dial member is rotated to thereby indicate the desired frequency reading.

7. A mechanical linkage system as claimed in claim 6 wherein said dial member is of a transparent material.

8. A mechanical linkage system as claimed in claim 6 wherein said frame member supports on its upper surface a plate member having an arcuate front portion aligned with the curvature of the helical array.

9. A mechanical linkage system as claimed in claim 8 wherein said plate member is coated with a light colored material commencing at said front portion and extending over an area similar in width to that of the helical array with the remainder of said plate member being coated with a dark colored material.

10. A mechanical linkage system as claimed in claim 6 wherein the innermost index commencing the helical array represents the lower limit of the frequency band of operation.

11. A tuning mechanism for electronic apparatus of the type employing a non-linear relationship between a movable piston member and a fixed component within a resonant cavity to thereby tune the apparatus to a selected frequency, said tuning mechanism comprising rotatable screw member activating a horizontal frame member through a system of meshing gears, said rotatable member supporting a rotatable planar dial member above said frame member, a plurality of substantially equally spaced frequency markings defined on said dial member in a helical array, the array commencing adjacent to the center of the dial member indicating the lower frequency limit and progressing outwardly to the upper frequency limit, said frame member advancing in a straight line a predetermined dimension for each increment of rotation of said rotatable dial member and having means for indicating the frequency at which the apparatus is resonant.

12. A tuning mechanism as claimed in claim 11 wherein said indicating means comprises a light colored coating on said frame member having a width equal to that of the helical array.

13. A tuning mechanism as claimed in claim 11 wherein the radius of the innermost index in the helical array from the center of the dial member is determined from the equation:

$$r_1 = \frac{\frac{p\pi}{10}(L_1 - L_2)\tan\theta_2}{\tan\theta_1 - \tan\theta_2}$$

where $L_1$ is the length of the resonant cavity for the lower frequency limit $f_1$ and $L_2$ is the length of the resonant cavity for the upper frequency limit $f_2$, $p$ is the pitch of the rotatable screw member, $\theta_1$ is the angle traversed in rotating from $f_1$ to $f_1+1$ and $\theta_2$ is the angle traversed in rotating from $f_2-1$ to $f_2$

References Cited in the file of this patent

UNITED STATES PATENTS

| | | |
|---|---|---|
| 2,373,168 | Cockerell | Apr. 10, 1945 |
| 2,496,454 | Elliott | Feb. 7, 1950 |
| 2,517,605 | Smyith et al. | Aug. 8, 1950 |
| 2,572,232 | Wolfe | Oct. 23, 1951 |
| 2,849,691 | De Tar | Aug. 26, 1958 |
| 2,912,957 | Berger | Nov. 17, 1959 |
| 2,919,419 | Rivers | Dec. 29, 1959 |
| 2,970,562 | Loffelbein | Feb. 7, 1961 |